US007555452B2

(12) United States Patent
Van Lier

(10) Patent No.: US 7,555,452 B2
(45) Date of Patent: Jun. 30, 2009

(54) METHOD BASED ON MULTIPLE SHARE COMBINATIONS FOR OPTIMIZING THE RETURN OF AN INVESTMENT PORTFOLIO

(76) Inventor: Edouard Van Lier, 2 Zwaluwenlaan, Wemmel, Brussels (BE) 1780

( * ) Notice: Subject to any disclaimer, the term of this patent is extended or adjusted under 35 U.S.C. 154(b) by 935 days.

(21) Appl. No.: 10/751,748

(22) Filed: Jan. 6, 2004

(65) Prior Publication Data
US 2005/0149422 A1    Jul. 7, 2005

(51) Int. Cl.
*G06Q 40/00*    (2006.01)
(52) U.S. Cl. ...................................... 705/36 R; 705/35
(58) Field of Classification Search .............. 705/36 R, 705/35, 37; 708/131, 132, 134; 434/107, 434/109, 188
See application file for complete search history.

(56) References Cited

U.S. PATENT DOCUMENTS

| | | | | | |
|---|---|---|---|---|---|
| 5,220,500 | A | * | 6/1993 | Baird et al. ............... | 705/36 R |
| 5,933,815 | A | * | 8/1999 | Golden ...................... | 705/36 R |
| 6,484,151 | B1 | * | 11/2002 | O'Shaughnessy ......... | 705/36 R |
| 6,601,044 | B1 | * | 7/2003 | Wallman ................... | 705/36 R |
| 6,832,210 | B1 | * | 12/2004 | Li .............................. | 705/36 R |
| 2003/0101129 | A1 | * | 5/2003 | Waddell et al. ............. | 705/37 |

OTHER PUBLICATIONS

Profiting from the Vargaries of Human Nature by Andrew Capan, Global Investor, Jul./Aug. 1994, issue 74, p. 17.*
Against the Tide; Contrarian Picks for When the Market Turns Aline Sullivan. International Herald Tribune. Paris: May 16, 1998. p. 17.*
Vanguard Windsor Fund Prospectus, Jun. 1, 1999. Retrieved from http://www.sec.gov/Archives/edgar/data/107606/0000893220-99-000415.txt.*
Gatev, Evan G. et al. "Pairs Trading: performance of a relative value arbitrage rule", Yale School of Management, New Haven, CT, First Draft Jun. 1998; Current Draft: Feb. 27, 1999.

* cited by examiner

*Primary Examiner*—Mary Cheung
*Assistant Examiner*—Brian Fertig
(74) *Attorney, Agent, or Firm*—Young & Thompson

(57) ABSTRACT

A method and a computer program for optimizing the return of an investment portfolio are disclosed. Pre-selected stocks are swapped in function of their inter-related price fluctuations. As soon as a stock rises more than say 15% compared to other stocks, half of it is sold to acquire the cheaper shares. By doing so systematically for all possible stock combinations, the number of shares increase gradually and eventually their values, as compared to a classic buy-and-hold strategy or a global index. The process includes a mechanism that creates and exploits multiple stock combinations, growing sharply with the number of stocks held. A spreadsheet traces actual share-price correlation and manages the portfolio, starting from a buy and hold strategy, applying a buy-low and sell-high tactic, and containing risk through build-in stops. Thereby an adapted stock screening program is provided, enabling to construct a diversified portfolio with correctly priced, good value stocks.

31 Claims, 8 Drawing Sheets

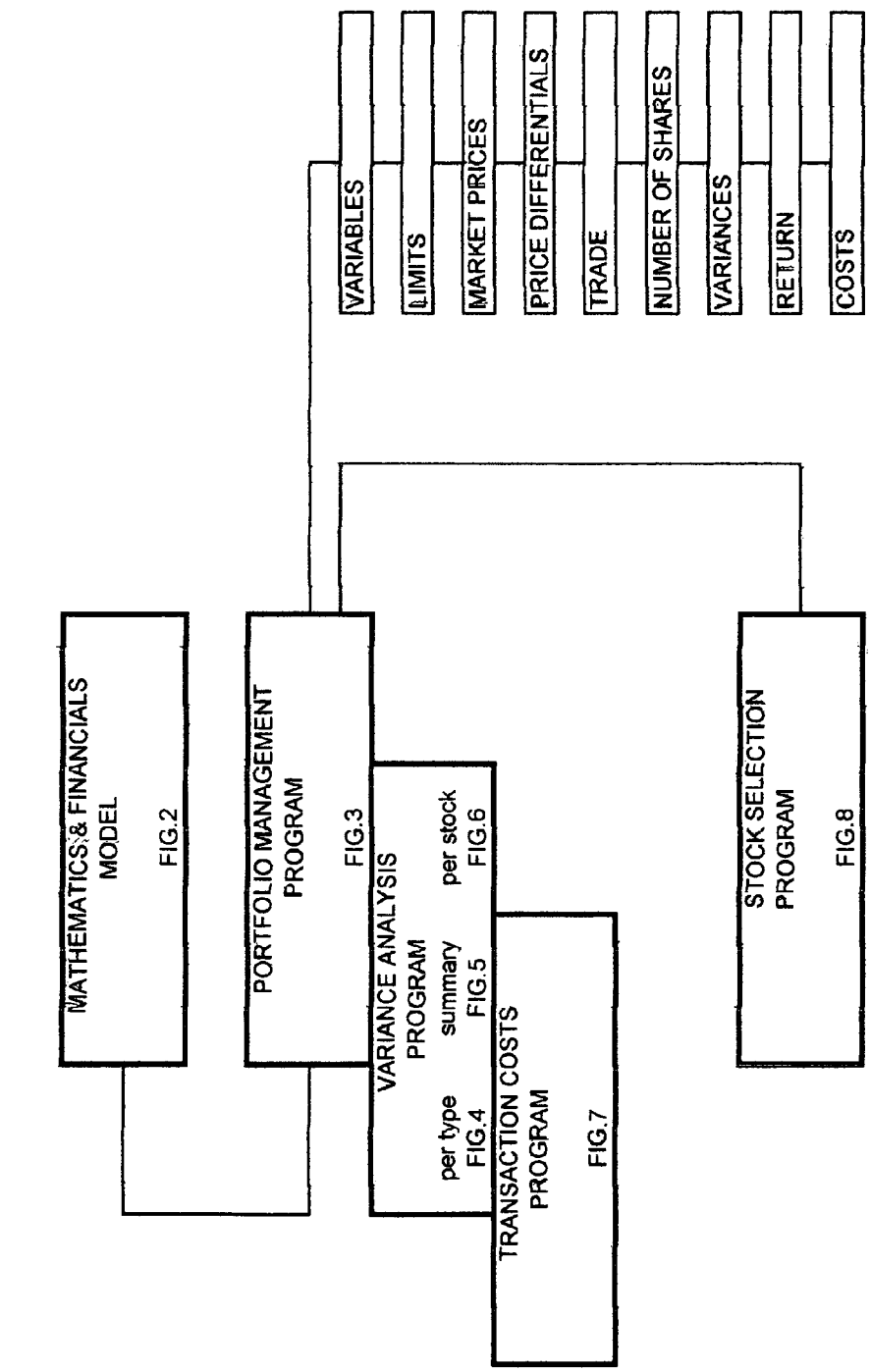

FIG.2 MATHEMATICS AND FINANCIALS

| | A | B | C | D | E | F | G | H | I |
|---|---|---|---|---|---|---|---|---|---|
| 1 | invest/stock= | 30.000 | | | | | | | |
| 2 | strike frequency | 1 | 2 | gross excess return | | cost | | net excess return | |
| 3 | | | trigger limit= | 15% | 10% | | | | |
| 4 | | | succes factor= | 0,4 | 0,4 | | | | |
| 5 | #stocks | # combinations | | | | | | | |
| 6 | 2 | 1 | 2 | 1,50% | 2,00% | 0,19% | 0,38% | 1,31% | 1,62% |
| 7 | 3 | 3 | 6 | 3,00% | 4,00% | 0,38% | 0,76% | 2,62% | 3,24% |
| 8 | 4 | 6 | 12 | 4,50% | 6,00% | 0,57% | 1,13% | 3,93% | 4,87% |
| 9 | 5 | 10 | 20 | 6,00% | 8,00% | 0,76% | 1,51% | 5,24% | 6,49% |
| 10 | 6 | 15 | 30 | 7,50% | 10,00% | 0,94% | 1,89% | 6,56% | 8,11% |
| 11 | 7 | 21 | 42 | 9,00% | 12,00% | 1,13% | 2,27% | 7,87% | 9,73% |
| 12 | 8 | 28 | 56 | 10,50% | 14,00% | 1,32% | 2,64% | 9,18% | 11,36% |
| 13 | 9 | 36 | 72 | 12,00% | 16,00% | 1,51% | 3,02% | 10,49% | 12,98% |
| 14 | 10 | 45 | 90 | 13,50% | 18,00% | 1,70% | 3,40% | 11,80% | 14,60% |
| 15 | 11 | 55 | 110 | 15,00% | 20,00% | 1,89% | 3,78% | 13,11% | 16,22% |
| 16 | 12 | 66 | 132 | 16,50% | 22,00% | 2,08% | 4,16% | 14,42% | 17,84% |
| 17 | 13 | 78 | 156 | 18,00% | 24,00% | 2,27% | 4,53% | 15,73% | 19,47% |
| 18 | 14 | 91 | 182 | 19,50% | 26,00% | 2,46% | 4,91% | 17,04% | 21,09% |
| 19 | 15 | 105 | 210 | 21,00% | 28,00% | 2,64% | 5,29% | 18,36% | 22,71% |
| 20 | 16 | 120 | 240 | 22,50% | 30,00% | 2,83% | 5,67% | 19,67% | 24,33% |
| 21 | 20 | 190 | 380 | 28,50% | 38,00% | 3,59% | 7,18% | 24,91% | 30,82% |
| 22 | 100 | 4950 | 9900 | 148,50% | 198,00% | 18,70% | 37,40% | 129,80% | 160,60% |
| 23 | 1000 | 499500 | 999000 | 1498,50% | 1998,00% | 188,69% | 377,39% | 1309,81% | 1620,61% |

FIG. 3 PORTFOLIO MANAGEMENT PROGRAM

| | A | B | C | D | E | F | G |
|---|---|---|---|---|---|---|---|
| | | share prices | | | period | | |
| 1 | | | | | | | |
| 2 | A | B | C | D | | A/B | A/C |
| 3 | | | | | | | |
| 4 | | | | | | | |
| 5 | 29 | 35,68 | 40,32 | 4,45 | 18-Jan-00 | 1,15 | 1,08 |
| 6 | 28,97 | 39,56 | 38 | 5,20 | 10-Jan-00 | 1,04 | 1,14 |
| 7 | 28,32 | 40,19 | 42,38 | 4,86 | 3-Jan-00 | 1 | 1 |

| | H | I | J | K | L | M | N |
|---|---|---|---|---|---|---|---|
| 1 | price differentials | | | | | | number of sha |
| 2 | A/D | B/C | B/D | C/D | A | B | C |
| 3 | | | | | | | |
| 4 | | | | | | | |
| 5 | 1,12 | 0,93 | 0,97 | 1,04 | 530 | 1176 | 1130 |
| 6 | 0,96 | 1,10 | 0,92 | 0,84 | 1059 | 746 | 1130 |
| 7 | 1 | 1 | 1 | 1 | 1059 | 746 | 708 |

| | O | P | Q | R | S | T | U |
|---|---|---|---|---|---|---|---|
| 1 | | | ACTUAL | ADDED | INITIAL | ADDED | CASH |
| 2 | D | TOTAL | PORTFOLIO | VALUE | PORTFOLIO | VALUE | POSITION |
| 3 | | SHARES | | METHOD | | % | |
| 4 | | # | | | | | |
| 5 | 3086 | 5922 | 116.612 | 3.306 | 113.316 | 2,8% | -10 |
| 6 | 3086 | 6021 | 119.178 | 0 | 119.189 | 0,0% | -11 |
| 7 | 6172 | 8685 | 119.977 | 0 | 119.977 | 0,0% | 0 |

FIG. 4 VARIANCE ANALYSIS PER TYPE

| V | W | X | Y | Z | AA |
|---|---|---|---|---|---|
| PRICE VARIANCE | MIX VARIANCE | QUANTITY VARIANCE | CAPITAL GAIN | TOTAL VARIANCE | TOTAL VARIANCE % |
| -6.662 | -3.286 | 5.185 | 1.407 | -3.356 | -2,8% |
| -788 | -3.932 | 2.885 | 1.047 | -788 | -0,7% |
| 0 | 0 | 0 | 0 | 0 | 0,0% |

| AB | AC | AD | AE | AF | AG |
|---|---|---|---|---|---|
| | average purchase price | | | STOCK EXCHANGE INDEX | |
| A | B | C | D | | |
| | | | | DOW | NASDAQ |
| 28,32 | 38,54 | 40,74 | 4,86 | 11252 | 4235 |
| 28,32 | 40,19 | 40,74 | 4,86 | 11723 | 4064 |
| 28,32 | 40,19 | 42,38 | 4,86 | 11523 | 3883 |
| | | | | 11523 | 3883 |

FIG. 5 VARIANCE ANALYSIS SUMMARY

| | AH | AI | AJ | AK |
|---|---|---|---|---|
| | \multicolumn{4}{c}{summary variances YTD} | | | |
| | CHANCE | INDEX | METHOD | TOT |
| 5 | -6,1% | 0,5% | 2,8% | -2,8% |
| 6 | -3,1% | 2,5% | 0,0% | -0,7% |
| 7 | 0,0% | 0,0% | 0,0% | 0,0% |

| | AL | AM | AN | AO |
|---|---|---|---|---|
| | \multicolumn{4}{c}{summary variances period} | | | |
| | CHANCE | INDEX | METHOD | TOT |
| 5 | -2,9% | -2,0% | 2,8% | -2,1% |
| 6 | -3,1% | 2,5% | 0,0% | -0,7% |
| 7 | 0,0% | 0,0% | 0,0% | 0,0% |

FIG. 6 VARIANCE ANALYSIS PER STOCK

| AP | AQ | AR | AS | AT | AU |
|---|---|---|---|---|---|
| A | B | C | D | | |
| total variance per stock per period | | | | | |
| | | | | | |
| 720 | -3.364 | -479 | -232 | | |
| 32 | -2.894 | 2.622 | -2.327 | -2.568 | -3.356 |
| 688 | -470 | -3.101 | 2.095 | -788 | -788 |
| 0 | 0 | 0 | 0 | 0 | 0 |

| AV | AW | AX | AY | AZ | BA |
|---|---|---|---|---|---|
| A | B | C | D | | |
| method variance per stock per period | | | | | |
| | | | | | |
| 0 | 0 | 979 | 2.327 | | |
| 0 | 0 | 979 | 2.327 | 3.306 | 3.306 |
| 0 | 0 | 0 | 0 | 0 | 0 |
| 0 | 0 | 0 | 0 | 0 | 0 |

FIG. 7 TRANSACTION COSTS

| | BB | BC | BD | BE | BF |
|---|---|---|---|---|---|
| | | | transaction costs | | |
| | A | B | C | D | TOT |
| 1 | | | | | |
| 2 | | | | | |
| 3 | | | | | |
| 4 | | | | | |
| 5 | 15341 | 15342 | 0 | 0 | 30683 |
| 6 | 0 | 0 | 16036 | 16047 | 32083 |
| 7 | 0 | 0 | 0 | 0 | 0 |
| | | | | | 107 |

| | BG | BH | BI | BJ | BK |
|---|---|---|---|---|---|
| 1 | | | | | |
| 2 | | | | | |
| 3 | | | | | |
| 4 | | | | | |
| 5 | 2 | | | | |
| 6 | 2 | | | | |
| 7 | 0 | | | | |
| | 120 | 227 | 56,63 | | |

FIG.8 STOCK SELECTION

| | A | B | C | D | E | F | G |
|---|---|---|---|---|---|---|---|
| 1 | NEWWACC | range | %EVA | P/E | D/E | P/BOOK | premium |
| 2 | 11/09/03 | 1 | 2,4 | 12,0 | 20 | 1,9 | 11 |
| 3 | JOHNSON&J | 1 | 13,8 | 25,8 | -2 | 7,5 | 11 |
| 4 | CENTEX | 0 | 8,4 | 11,1 | 14 | 2,3 | -36 |

| | H | I | J | K | L | M | N | O |
|---|---|---|---|---|---|---|---|---|
| 1 | SALES | OP.INC | othInc | iInc | iExp | except | taxes | netIncome |
| 2 | 200 | 20 | | 0 | 1,5 | | 6,475 | 12,025 |
| 3 | 36298 | 9489 | -294 | 256 | 160 | 0 | 2694 | 6597 |
| 4 | 9117 | 945 | -30 | 0 | 119 | 0 | 240 | 556 |

| | P | Q | R | S | T | U |
|---|---|---|---|---|---|---|
| 1 | depreciation | #shares | shPrice | buy at | shValue | McKinsey |
| 2 | 10 | 1 | 144,3 | 130 | 233 | 144,3 |
| 3 | 1662 | 3272 | 52,1 | 47 | 43 | 73 |
| 4 | 113 | 62,25 | 99 | 154 | 217 | 199 |

| | V | W | X | Y | Z | AA |
|---|---|---|---|---|---|---|
| 1 | netAssets | EQUITY | PROV | NETDebt | AVcapExp | dividends |
| 2 | 100 | 75 | 10 | 15 | 8 | 2,25 |
| 3 | 26522 | 22697 | 4388 | -563 | 2099 | 2381 |
| 4 | 3187 | 2658 | 170 | 359 | 62 | 10 |

| | AB | AC | AD | AE |
|---|---|---|---|---|
| 1 | | | | |
| 2 | | | | |
| 3 | USA | 2002 | | GOOD GOVERNANCE |
| 4 | USA | 2003 | 3 | CHECK MORTGAGE LOANS/LI INVESTMENTS |

| | AF | AG | AH | AI | AJ | AK |
|---|---|---|---|---|---|---|
| 1 | YouPay100 | EQUITY | ASSETS | SALES | OPS | YFCF |
| 2 | for | 52 | 69 | 139 | 14 | 10 |
| 3 | JNJ | 13 | 16 | 21 | 6 | 4 |
| 4 | CTX | 43 | 52 | 148 | 15 | 11 |

| | AL | AM | AN | AO | AP |
|---|---|---|---|---|---|
| 1 | FFCF | FFCF/YFCF | P/FCF | YFCF/ASSET | DEBT/YFCF |
| 2 | 100 | 10 | 10 | 15,0% | 1 |
| 3 | 140 | 38 | 27 | 23,6% | 0 |
| 4 | 201 | 18 | 9 | 21,5% | 1 |

| | AQ | AR | AS | AT | AU | AV | AW |
|---|---|---|---|---|---|---|---|
| 1 | start | today | diff | 2Y H | 2Y L | strike | diff |
| 2 | | | | | | | |
| 3 | 57 | 52,1 | -9% | 65,5 | 42 | 40,6 | 28% |
| 4 | 52 | 99 | 90% | 91,1 | 36,5 | 78,6 | 26% |

METHOD BASED ON MULTIPLE SHARE COMBINATIONS FOR OPTIMIZING THE RETURN OF AN INVESTMENT PORTFOLIO

BACKGROUND

The invention relates generally to methods for managing investment portfolio and more particularly to a method based on multiple share combinations and interrelated share variation price for optimizing the return of an investment portfolio.

The behavior of the stock market, of a group of shares or of an individual share, has proven to be random, dependant, unpredictable, irrational and risky:

a) Almost random: chance predominates, professional analysis only rarely produces better results than coin flipping.

b) Sometimes dependant: stocks' performances are not always independent of each other, when one goes up in response to some news, the others' chances of going up or down may be affected and this in turn affects their joint volatility (see John Allen Paulos, "A Mathematician Plays the Market", Allen Lane, The Penguin Press, 2003).

c) Often unpredictable: even the owner of a company cannot be sure about what is going to happen tomorrow with his company and its share price, how could external people know, be it experts or analysts? Indications like past earnings are no help in predicting future growth.

d) Occasionally irrational: every stock can only be worth the value of the cash flow it is able to earn for the benefit of investors (see Burton G. Malkiel, "A Random Walk down Wall Street", W.W. Norton & Company Inc, 2003). But stock prices fluctuate more than the long term fundamentals of a corporation, they clearly overreact temporarily to market, forces, news and noise (see John Y. Campbell & Robert J. Shiller, "Valuation Ratios and the Long-Run Stock Market Outlook" paper written in July 1997, based on the authors' testimony before the Board of Governors of the Federal Reserve System Dec. 3, 1996).

e) Always risky: the higher the return, the higher the risk, and high risk means that the return may not materialize or may even turn into a loss (see Paul Jorlon, "Investing in a Post-Enron World", McGraw Hill, 2003).

To beat the market, different categories of investors are using quite opposite strategies:

fundamentalists versus chartists sell winner buy loser versus buy winner sell looser long term buy and hold versus instant trade but neither theory seems to be right or wrong and, due to randomness, today's winners are tomorrow losers and vice versa.

The records of all categories of professional investors have been studied and, as indicated by Malkiel, no sizeable differences in performance of common stock portfolios exist, nor has their performance as a group been any better than of a broad-based market index.

simply picking and holding stocks and investing in a broad market index is a strategy that is hard to beat. Unless the investor or the professional portfolio manager disposes of a system that consistently acts within a chosen strategy and according a chosen pattern, while neutralizing the effect of randomness, dependency, unpredictability, irrationality and riskiness.

Some strategies have tried to detect joint volatility between stocks and use such correlation to improve performance. If a few were able to generate sufficient excess return over a given period of time, like pair trading (see Evan G. Gatev, William N. Goetzmann and K. Geert Rouwenhorst, "Pairs Trading: performance of a relative value arbitrage rule", Yale School of Management, draft Feb. 27, 1999), all depended on finding closely negatively correlated pairs of shares. Again, as this is based on historical price evolutions, the use of it for future decision taking eventually turns out to be useless.

SUMMARY OF THE INVENTION

The present invention discloses a method that does not require the markets or stocks to be always logic, independent, predictable and rational. While trying to neutralize these market forces systematically, the method can improve over time the return of a portfolio, as compared to a pure random walk, a buy-and-hold strategy or a broad market index.

The disclosed method is furthermore based on a fundamentalist view for stock selection, a buy and hold strategy, a buy low and sell high tactic, a risk adverse approach with a diversified portfolio and build in limits and stops. The method includes a mechanism that creates a situation of multiple share combinations, traces their actual correlation, and initiates selling and buying, in order to exponentially increase the numbers of shares held and, eventually, their value. There is no such system in the market that applies this new method and its mechanism.

The method can be used by different players under different circumstances:

in parallel with existing, traditional techniques by professionals involved in money-management (funds, investment bankers, brokerage houses);

by private investors, to increase assets and improve performance, under disclosed circumstances;

the disclosed method is also to be used for further development of an automatic on-line instrument for portfolio management;

it can also be used for research by universities, to examine the effect of the disclosed concept in its different variants on performance, or as a model to examine correlation between different stocks.

The system consists of tracking a selected number of publicly traded stocks, in order to sell and buy these stocks, in function of their inter-related price evolution. As soon as a given stock attains a relative price difference of a predefined level with another stock, shares of the two stocks are reversed buy selling a portion of the shares that rose to buy the shares that fell.

As stock prices can fluctuate 1-3% each day and 3-10% every week, leveraging these fluctuations as outlined may improve the return. By exchanging systematically expensive shares for cheaper shares, the number of shares will increase and also, over time the value of the portfolio, as compared to a classic buy-and-hold or stock picking approach.

In the different versions used for testing, the portfolios comprised from 4 up to 12 different stocks and half of the shares were sold against each other, each time the relative price difference attained 15%, for example, Minimum and maximum $ (or Euro) amounts were defined to be held in each stock in order to maintain a plausible risk diversification.

The methods and formulas employed by the system were developed through years of observation, investing, research, analysis and evaluation by the inventor, as a professional finance executive. Recently, testing over a number of years tend to confirm the validity of the system. The testing covers periods of 3 up to 20 years (between 1983 and part of 2003) with various trading intervals of one day, a week and a month. Portfolios were either existing or constituted with shares chosen randomly. An excess return was generated in the majority of the years (7 out or 10) and the average ranged between 5 and 25%, with exceptionally yearly extremes of −39% and +51%. Detailed results and documentation of these tests can be provided on request.

By systematically leveraging the price fluctuations, the system is able to increase the value of the assets under management. Apart from improving the return, other advantages of this approach can be identified as follows:

a) Return is generated without watching continuously the ticker, as opposed to daily trading.

b) The time span can be adapted to someone's agenda or life style; buy and sell orders can be executed daily, two-daily, weekly or more, or depending on the volatility of the markets; testing has shown that weekly observing and trading is sufficient to benefit from the process.

c) Decisions are generated by a process with embedded rules, avoiding desperate, disparate and emotional behavior of investors or money managers, especially in turbulent times.

d) The process is disciplined in a form of buying low and selling high, a courageous attitude that benefits but is difficult to apply.

e) The strategy is not build on hazardous or uncontrollable events like extrapolations, projections, news or noise. Applying the rules of the system avoids temptation to throw money away at speculations on stocks or risky techniques like margin trading.

f) While preparing for higher return, risk is contained through generating limits and consequent stops; in other words, the higher return is not achieved through higher risk.

g) The system can be applied on an existing portfolio or on a new one, or the portfolio can be gradually constituted while initiating the process.

h) When constituted, not all shares of the new portfolio are acquired at once but gradually, in line with the buy-cheap approach.

i) The process is a self-financing one, as soon as the portfolio is constituted.

j) It can be tailored to each specific situation and can serve both professional and private investors, fundamentalists or technicians, big and small portfolios of all kinds.

k) It can be a complementary instrument for the professional money manager, who must dispose of various means in its efforts to beat the market.

Like in any process, there are also weaknesses, depending on the user (private or professional investor) as highlighted hereafter:

a) Investing in individual stocks is always risky, whatever method used, as there is an extremely large part of chance involved.

b) Good stock picking and diversification remain crucial (the system can earn excess return with bad stocks, but the total return is of course determined by the stocks selected).

c) No one person can consistently achieve better overall results than the market and a system that enables so would be quickly wiped out, according the theory of Burton Malkiel (see Burton G. Malkiel, "A Random Walk down Wall Street", W.W. Norton & Company Inc, 2003) and other observers.

d) There is no immediate return, only after a given time span; return can be initially and temporarily negative, as falling stocks are exchanged for rising stocks (although random, trends continue for a while on the stock market: stocks that are rising keep on rising, stocks that are falling keep on falling and stocks at rest remain at rest).

e) Final decisions to sell or buy remain with the user and they can vary from the system's indicator, thus influencing the return. Buy and sell tactics remain important and influence the return, or can lead to lost opportunities (for example put buy/sell orders at market price or with a limit; or timing constrains, for example when you have to sell a stock before being allowed to buy another one).

f) Transaction costs need to be closely monitored: although rates are becoming very low, the number of transactions can grow fast. Some countries apply a stock exchange tax, often a small fraction of a percentage, but transaction amounts add up quickly.

g) Taxes can influence the net return.

h) Learning curve: the practical application requires a period of learning, to get acquainted with the different phases and subparts of the process.

i) The disclosed specific embodiment is in excel program, ready to use but off-line and semi-manual; a fully automatic and on-line program will only be available after protection, development and alliance with specialized partners.

The invention can be practiced in the following ways:

Manually: simply applying the disclosed concept, process and formulas (small portfolios).

Semi-automated: applying the disclosed concept, process, and formulas, using the disclosed Microsoft Excel spreadsheets, as described in the specific embodiments.

Fully automated: upgrading the spreadsheet version with an automatic self correcting and monitoring program.

On line: develop the disclosed application for connecting with internet applications for all inputs (securities in real time, stock prices, stock screener) and outputs (execute trades automatically).

Fully automated and on-line applications of the disclosed process can be developed, once protection for the invention has been granted. These future developments are as such not taken up in the specification, but protection of the rights for further development is claimed.

If the size of the portfolio can vary and has no limits, it should start from a minimum number of shares and a minimum investment amount per stock. Taking into account diversification and transaction costs, a minimum of 4 or 6 shares and $30 000 per share would be an absolute required minimum.

(In the case of individual investors with more limited resources, a solution of portfolio sharing can be set up to overcome these limits. This kind of shared application could be used in an investment club.)

The process includes the different steps of
Selecting companies
Fixing variables
Building in checks, limits and stops
Trading prices
Calculating price differentials
Executing trade, orders, partial orders
Adapting share quantities
Analyzing variances
Measuring return and excess return
Calculating transaction costs These different phases, together with the underlying argumentation and details of the methodology, are described in the detailed description of the invention.

BRIEF DESCRIPTION OF THE DRAWINGS

The figures of the drawings are referred to in the detailed specification which follows:

FIG. 1 illustrates schematically some of the process steps of the method of the invention method;

FIG. 2 is a computer spreadsheet illustrating the mathematics and financials model according to the invention (theoretical calculations and formulas);

FIGS. 3 to 7 is a computer spreadsheet illustrating the portfolio management program that includes all steps and formulas of the core process, variance analysis per type (comprising formulas for detailed variance calculation), variance analysis summary (summarizing the variances), variance analysis per stock (detailing the variances for each stock) and transaction costs (calculating transaction costs); and FIG. 8 is a computer spreadsheet illustrating an additional program for stock selection (with stock selection criteria).

DETAILED DESCRIPTION OF THE INVENTION

Before explaining in detail the disclosed embodiment of the invention, it has to be stated that the invention in not limited in its application to the details of the specific enclosed descriptions, since the invention is capable of other embodiments. Also, the terminology and symbols used in the description are for the purpose of description and not of limitation.

The detailed description uses a specific embodiment of the methodology. Starting from there, due to the many variables and their possible combinations, an almost unlimited number of variants can be worked out, thus enabling to adapt the specific embodiment to each particular situation. Basic variants have been identified in the detailed description. Other possible variants, departing from the standard concept and using the disclosed basic process, are also fall with the scope of protection of the appending claims.

The invention embodies a process for investing that operates as illustrated by the following, simplified example:

Track two good, Fairly priced companies A and B. As soon as one of both stocks falls against the other, (whatever the absolute price or market evolution be), start with buying the falling stock. Assume A falls 20% against B, thus you buy A. Then the price can go either way: either A falls again 20% compared to B and you increase your holdings in A, or A bounces back 20% as compared to B and you start buying B. After that, continue the action by each time selling half of what you already own in the rising stock, to buy the cheaper one. This can happen several times in a round and you repeat the action until one of the stocks reaches a trading limit.

As soon as you can't buy A or B anymore, start buying instead a third stock C and continue the action by combining the three stocks A, B and C. This gives you now three possible combinations (A-B, A-C, B-C) instead of just one (A-B). As you increase the number of companies, you will not only diversify the risk but you also prepare for higher return. As you own more different stocks, the number of potential transactions will increase exponentially. There is no limitation for the number of companies to be held, as long as it remains manage-able. Investing in 4 different companies will offer 6 combinations, investing in 5 companies give 10 combinations, 8 companies give 28 combinations, 12 companies give 66 combinations, investing in 30 different companies will give 435 combinations, etc:

$$N=C(C-1)/2$$

with
C=number of companies
N=possible combinations

The trading goes on until you reach a maximum amount that you are willing to invest in one stock, to play it safer. Put also a lower amount in order to limit transaction cost to less than a fraction of 1%. Those build in limits are also important for self-correction and avoid unreasonably heavy investing in just one or a few stocks, especially in times of high volatility.

Invested amounts and upper/lower limits should take into consideration the transaction costs. Price fluctuation % should be based on practical experience of a type of industry and stock market; the % Should neither be too low (increases the number of transactions but also the costs) or too high (increases the gains per transaction but can limit the number of transactions).

The process can also be initiated for an existing portfolio of shares. You can adapt gradually the mix and number of shares you own to the prerequisites of the method. When creating a new portfolio, you can also start buying gradually those stocks that decreased relatively to the others.

If you own healthy companies which in the longer run create value for the shareholder, exploiting methodically their interrelated price fluctuations will gradually increase the number of shares owned in each company. The choice of the companies can be left to each investor's conviction or temperament, but as the system works to gradually create return over time, the portfolio should comprise a majority of correctly priced, value creating companies. The reason for using good stocks seems evident: if a stock that you initially paid 100 is still worth 100 over time, your assets will be worth 100 plus the fruit of the system (increased number of stocks held); if over time the stock is worth 150, your assets will be in excess of 150 due to the fruit of the system; if however the stock had gone down to 50, your assets would be more than 50, but lower than the initial investment of 100, if the excess return of the method doesn't cover the gap.

The following is another simplified example and goes for an existing portfolio (as opposed to the first example, where the portfolio still had to be constituted):

When you own 100 shares of A at $1 and 100 shares of B at $1 and after a while A is still at $1 and B at £1.20, you are going to sell half of B or 50 shares to buy 60 shares of A. You haven't gained a lot yet with your action (only the market value of B increased, but wait, it will go down again). But you own anyway 210 shares in total or 5% more (160 in A and 50 in B). Then B falls back to $1 while A still didn't move, you sell half or 80 shares of A to buy 80 shares of B, at that moment you not only have 5% more shares (80 in A and 130 in B) but you also own 5% more in value, although both stocks are still at $1. You simply exploited the price differential, instead of just buying and then do nothing but wait and see the shares fluctuate. You can do this over and over again with more and more shares.

According the financial mathematical logic, your holdings increase gradually, always remembering that it cannot prevent crashes or unexpected hectic fluctuations, which inevitably will occur (the packages of shares you accumulated become worthless if their share prices drop to zero). But remember we try to invest in "good" shares, diversify and put limits.

Now, if you restart the former example with stock B going down to $0.8333 instead of going up, then you would have sold half or 50 shares of A worth 60 shares of B. The market fell and so did you (be patient, it will go up again), but you increased the number of shares. When B bounces back to its level of $1 and you sell half of B for A, you own again 210 shares, instead of the 200 shares you started with. The finality is the same, although the intermediate circumstances are quite different. In the first example you realize a higher (reinvested) capital gain, whereas in the second example you start with a capital loss followed by a capital gain (and in fact you realize a smaller capital gain to own cheaper shares, but more on that later).

The method can be applied for an unlimited number of combinations:

a) The number of stocks can be different and also the investment amounts, spread equally or differently per stock.

b) The portfolio can be continuous or re-balanced periodically, for example once every year or every two years, in order to correct too high concentration and redress diversification.

c) Different types of stocks can be used (big cap, small cap, international, low P/E, low D/E, pricing, mixture, etc.).

d) The type of portfolio (diversified, sectored, international, pairs of stocks, cash portion).

e) The way of constituting the portfolio (existing, gradual build up, capital gain not or partly reinvested).

f) The price differential percentage may be scaled, for example 15-10-5% for descending quantities.

g) The portion of shares to be sold can vary (for example, sell ¼, sell half, 4, or all), their combinations (sell all until half of the stocks are sold out, then sell half).

h) Different ways to define minimum and maximum limits that can be invested in one single stock (dollar amount, number of shares, portion of total portfolio, weighted)

i) Include alerts for not trading (for example stop buying a stock that suddenly falls heavily, indications that something serious is going on).

j) Include stop-losses (divest a stock completely and replace it by another one, as soon as it has fallen more than a given percentage).

k) Cash movements and cash positioning in line with market index (contrarian like the shares).

l) Trading period (daily, weekly, a/o.)

m) Warm up period to get initiated, like starting daily and then go weekly.

n) Portfolios shared between different investors in order to get the greater scale effect.

Once you have opted for a major alternative, its better to stick with it as the benefit comes ultimately from consistency, unless market conditions require an adapted strategy (like reasons to deselect a stock, revise the limits for better workability). Each alternative can give a different return and sometimes combinations of several variants can give interesting opportunities (research and simulation can be done using an historical portfolio, randomly chosen stocks or theoretical portfolio and index).

The following part explains first the combined mathematics and financials of the system. The spreadsheet reproduced in FIG. 2 illustrates how an excess return is theoretically realized, integrating the following variables of the formula:

Number of stocks
Initial investment amount per stock
Number of combinations
Price differential
Limits per stock
Portion sold
Average return per strike
Number of strikes per year
Success factor
Transaction costs First some practical observations about these variables as shown in FIG. 1, before going to the theoretical formulas.

a) Number of stocks: although the number of stocks can be unlimited, a too high number could increase the degree of complication and affect the theoretical return; also, transaction costs could increase to a level that does not justify the investment anymore (but these are considerations dictated more by prudent logic than by extended research on this subject); less than 6 companies would also limit the level of expected return as the number of strikes could be limited, but depending on the relative volatility of the chosen stocks.

b) Initial investment amount per stock: should be relevant (from $30 000 on) to enable sufficient transactions at acceptable low cost percentage. An amount smaller than $30 000 per stock can quickly lead to blockage: selling twice half of the stock leaves you with $7 500, relative transaction costs increasing accordingly.

c) Number of combinations: initially depending on the number of shares and the time span, but influenced by The price differential
Limits per stock
The relative and combined volatility, influencing the number of strikes per year
And practical implications d) The price differential should be set sufficiently high, as the purpose is not to trade daily, but to swap a combination once or twice a year with a consistent gain. Observations show that stock prices can fluctuate 1-3% each day and 3-10% each week, meaning that with a combination of several stocks a 10 or 15% price differential is an attainable trigger target, which can occur several times a year for a given pair of stocks. The function of the price differential % that commands the sell and buy actions is crucial for the system. A stock price that is moving upwards or downwards tends to keep on moving in that same direction for a while, whereas a stock at rest tends to remain at rest. Therefore, an adequate differential % will increase both the number of transactions and the profit. Also, to keep the system working and to avoid inaction, when a stock keeps rising and rising, or falling and falling, the measurement of the differential % must always be reinitiated, each time that the limit % has been reached (as detailed herein after).

e) Limits per stock: the minimum and maximum amount that can be held in one stock (depending on the initial investment amount, for example divided by 4 and multiplied by 3 and depending also on the portion that you are going to sell, namely ½).

f) The portion sold may be different from 50%, between say 10% and 100% and can be affected by the limits of the outstanding quantities. But selling half up to preset limits, as a rule, is the best feasible way to combine return and safety, while not concentrating a too high portion of the investment in just one or a few shares. Selling half has been used for all applications and testing.

g) Average return per strike: needs to be considered relative to the total investment; thus, one strike at 20% price difference and selling half, gives a 5% return in a portfolio with 2 different stocks, as explained in the above given example; the same strike has a return of 3.33% for a portfolio with 3 shares, a return of 2.5% with 4 shares, etc.

h) Number of strikes per year: depending on the number of stocks following the formula given above:

$$N = C(C-1)/2$$

with $C$ = number of companies
$N$ = possible combinations and the frequency of occurrence (F). In the testing covering a period of 20 years, between 1 and 5 strikes a year occurred for a price differential of 15% (the model in FIG. 2 takes a more conservative occurrence of only 1 and 2 strikes). The number of strikes per year is then:

$$F*C(C-1)/2 \text{ or } F*N$$

i) Success factor: a calculated, theoretical number of strikes will be further reduced by practical implications, which are difficult to quantify. Situations occur where the projected trade cannot go through:

Sold out or fully loaded (too few shares to sell or too many shares to buy further)

Incompatibility: sell stocks X for Y and Y for Z will end up in only selling only stock X for Z Timing: if you need to sell a stock before you can buy another one, opportunities can be missed It was also observed that the success factor could decrease with the number of stocks, which sounds logic, as the degree of complication is greater. Over a test period of 20 years, the average success factor was 0.58, 0.47 and 0.38 for respectively 4, 6 and 8 stock; but the observations are a too limited to draw conclusions on proportionality. Therefore, the financial spreadsheet of FIG. 2 simplifies and applies 0.4 straightforward, knowing that more refining could be achieved by applying a descending factor with a higher number of stocks.

The excess return, before transaction costs, is then the number of executed strikes multiplied by the gain per strike, calculated as follows:

$$P/(C*2)*S*F*N$$

with
P=% price differential
C=number of stocks
S=success factor
F=frequency of occurrence
N=number of combinations j) Transaction and other costs: depending on the type of intermediate, broker and stock exchange; the financial spreadsheet applies conservative rates, which can surely be reduced. A fixed amount of $29.95 is applied for each sell order and each buy order, and a stock exchange tax of 0.17% is added on each transaction amount, as is legally required in some European countries. Taxes from capital gains or losses are ignored for the calculation, but the portfolio management program can provide the tax basis.

Each of these variables and their underlying components are explained with the help of the excel spreadsheet: (FIG. 2)

(Column A): each line indicates the number of stocks in portfolio, ranging theoretically from 2 up to 1000; for example, line 10 is for 6 stocks, which is also the line used to explain the following columns and formulas.

(Column B)

=+A10*(A10−1)/2 applies the formula given above to calculate the number of possible combinations, depending on the number of stocks in portfolio, assuming one strike per combination per year (cell B2).

However, the number of fruitful combinations per year will also depend on the frequency of occurring, which can be zero, a half, one, twice etc. The outcome of the formula is therefore readjusted in column C.

(Column C)

=+B10*C$2

For a number of strikes different from 1, the desired number is entered in cell C2, namely 2 in the example, and the outcome of the formula in column B is multiplied by the chosen number.

(Column D)

=+D$3/2/$A10*D$4*B10 calculates the gross excess return, multiplying the number of combinations per year by the average return of one combination (or price differential percentage of cell D3 divided by 2, half of the shares being sold); column D supposes 1 strike per year per combination; the outcome is adjusted for a success factor (0.4 indicated in cell D4) which can theoretically be equal to one, but in practice lower than one, knowing that in practice a series of combinations will not come through, for different reasons explained above (limit amount attained, multiple choices, distortion and timing between sell and buy orders, practical complications).

(Column E)

=+E$3/2/$A10*E$4*C10 calculates the gross excess return as in column D, but for a different average return and for a different number of strikes.

(Column F)

=+((B10*2*29.95+$B$1*B10*2*0.17%)/($B$1*$A10))*(D$4+(1−D$4)/2)

calculates a conservative amount for transaction costs for the gross return of column D, applying the rates above (Column G)

=+((C10*2*29.95+$B$1*C10*2*0.17%)/($B$1*$A10))*(E$4+(1−E$4)/2)

idem as before, applied to column E $$(\text{Column } H \text{ and } I) = +D10 - F10$$
$$= +E10 - G10$$

calculates the net return by deducting transaction costs from gross return for the appropriate column.

Let's see the outcome of the former for a portfolio comprising six stocks (line 10), namely 15 combinations a year for 1 strike (column 2) and 30 combinations for 2 strikes (column 3). Applying the 0.4 success factor, assuming 1 strike and a 15% price spread, the excess return will be 7.5% (column 4) or 6.56% net (column 7). For a 10% price spread and assuming 2 strikes, with the same 0.4 success factor, the excess return will be 10% (column 5) or 8.11 net (column 7).

Now some words of caution. First, the excess return increases with the number of stocks, but from a given moment the return becomes purely theoretical, for the reasons mentioned earlier (manage-ability, digressive success factor). Second, the former theoretical reasoning assumes smooth evolution and regular correlation between shares and calculates return, all other things remaining unchanged. In reality, situations may occur where return is negatively influenced by big swings, by non-reversing trends, which inevitably will occur. For example, if only one of the shares moves several times in one direction, then to move several times in the other direction, while all the other shares remain unchanged, at the end of the road you are loosing (but of course, if also the other shares start moving in those directions, you will end up gaining again). Although fluctuations between stocks are the feeding of the system, sufficiently negative correlation over the longer range—as opposed to wild swings and positive correlation—is required to gradually construct the desired excess return.

That's why stock selecting and diversification remain crucial, as well as the build in limits to contain the impact of unavoidable, hectic situations.

The method also comprises a series of reporting functions, enabling self-learning through the in-build variance analysis of the different actions. Also, simulations and what-if scenarios can be worked out by feeding the system with estimated future share prices, based on a chosen scenario (continued moving average; reverse trend; random).

After the selection of the qualifying stocks (as explained herein after), the program manages the portfolio and keeps track of the price and volume changes, including:

daily/weekly/periodical follow up of share prices of the selected stocks relative price comparison and formulas calculate impact of buy/sell actions and formulas calculate return and variance analysis and formulas calculate transaction costs as explained in the following detailed spreadsheet equations. Usage is made of a simplified example, comprising only four shares (columns) and only two trading periods (lines), in order to facilitate and shorten the required description. Several functions are displayed hereafter in their simple basic version, without further automation or integration, which is the purpose of subsequent development.

The first part of the spreadsheet contains the portfolio management program (FIG. 3) as explained hereafter.

(Columns A up to D): input of the daily closing stock prices of stocks A, B, C and D.

(Column E): date.

(Columns F up to K)

=+F6*($A5/$A6/(B5/B6))

calculates the relative price spread for each stock combination (six possible combinations in this example: stock A with B, A-C, A-D, B-C, B-D and C-D). The spread is calculated as compared to the spread of the previous day and accumulated until it exceeds 15% (meaning outside the range of 0.85-1.15). As soon as the 15% limit is reached, the value of the related cell needs to be reset to 1. The excel function for conditional formatting is used to highlight when the trigger limit has been reach for any combination of stocks. The following cells (L up to O) keep track of the number of shares in each stock. Either the number of shares is retrieved if there is no action, input manually, or the number is recalculated by swapping the sold and bought quantities. Formulas depend on chosen criteria (sell half like in the example, sell all, or otherwise; sell but not buy all, etc.) and can be completed to limit the number of multiple transactions.

Conditional formatting of the Excel spreadsheet can be used to build in alerts that flash as soon as the quantity of shares falls outside a predefined range (set at minimum ¼ of the initial quantity and maximum 2.5 times the initial quantity).

Columns L=+ARRONDI(+L6/2;0)

Half of the shares of stock A will be sold, as the spread of A compared to another share B exceeds 15%.

The Excel function for conditional formatting is used to highlight whether the stocks can still be traded (if the value remains within a given range of upper and lower limits, either in $ or in number of shares).

General remark on the Excel formula: the program is originally written with the French version of Microsoft Excel (ARRONDI=ROUND).

Columns M=+M6+ARRONDI(+$L6/2*$A5/B5;0)

Additional shares of stock B are bought for the amount processed through the sale of shares of stock A. In other situations, processed amounts may have to be shared to purchase more than one stock; or also processes may come from different shares; in each case the formula is different in order to always match processed sales amounts with purchased amounts.

Columns N=+N6

No action for stock C, as all the spreads remained within the 15% limit.

Columns O=+O6

No action for stock D, as all the spreads remained within the 15% limit.

(Column P)

=+SOMME(L5:O5)

Indicates the total number of shares held, for info.

(Column Q)

=+L5*A5+M5*B5+N5*C5+O5*D5 calculates the market value of the actual portfolio, multiplying the quantities of shares held in each stock by its most recent market price.

(Column R)

=-(+A5*L$7+B5*M$7+C5*N$7+D5*O$7)+Q5-(U5-U$7)

calculates the excess return, comparing the market value of the actual portfolio with the market value of the initial portfolio (constituted with the number of shares held in each stock at the start), including the change in cash position.

(Column S)

=+A5*L$7+B5*M$7+C5*N$7+D5*O$7 calculates the value of the initial portfolio (not including cash position), multiplying the initial quantities held in each stock by its most recent market price.

(Column T)

=+R5/(S$7-U$7)

calculates the percentage of the excess return, relative to the initial capital employed (shares+cash).

(Column U)

=Q5-(+A5*L6+B5*M6+C5*N6+D5*O6)+U6 calculates the change in cash position of the day, multiplying the daily change in quantities in each stock by its recent market price. This column also controls the completeness of all the sell and buy actions (change in cash should be zero, unless a cash portion is deliberately invested or divested; the outcome can also be slightly different from zero due to rounding).

The following cells (V up to AG) analyze the different types of variances that occurred, by isolating the effects of price, mix, volume and capital gain from each other (FIG. 4).

(Column V)

=+L$7*(A5−A$7)+M$7*(B5−B$7)+N$7*(C5−C$7)+O$7*(D5−D$7)

calculates the "price variance", comparing the most recent market price of each stock with the Initial price paid for the stock at the start.

(Column W)

=+Z5−V5−Y5−X5 calculates the "mix variance" by difference, comparing the calculated total variance (=total return) with the calculated variances of price, mix and volume.

(Column X)

=+A$7*(L5−L$7)+B$7*(M5−M$7)+C$7*(N5−N$7)+D$7*(O5−O$7)

calculates the "volume variance", comparing the actual number of shares held in each stock with the initial number of shares held in that stock, valorized at the initial price paid for the stock at the start.

(Column Y)

=+((L5<L6))*(A5−AB5)*(L6−L5)+((M5<M6))*(B5−AC5)*(M6−M5)+((N5<N6))*(C5−AD5)*(N6−N5)+((O5<O6))*(D5−AE5)*(O6−O5)+Y6 accumulates the capital gains, calculated each time a stock is sold, by multiplying the number of shares sold in each stock by its price appreciation (difference between price sold and average purchase price of a stock).

(Column Z)

=+L5*A5−L$7*A$7+M5*B5−M$7*B$7+N5*C5−N$7*C$7+O5*D5−O$7*D$7−(U5−U$7)

calculates the "total variance", being the total return of the portfolio, comparing the market value of the actual portfolio with the value of the initial portfolio (constituted with the number of shares held in each stock at the start), including the change. In cash position.

(Column AA)

=+Z5/(S$7−U$7)

calculates the percentage of the total return, relative to the initial capital employed (stocks+cash).

(Columns AB up to AE)

=+((L6*AB6+(L5−L6)*A5)/L5)*(L5>L6)+AB6*(L6=L5)+AB6*(L5<L6)

recalculates the average purchase price of a stock, stock A in this example, weighting the number of shares already held and the newly bought shares at their respective purchase prices, each time that stock A is purchased.

(Column AF and AG): input of daily stock market index, Dow and NASDAQ in the example.

The following cells (AH up to AO) summarize which parts of the return are due to either chance, index evolution or generated by the "method" (FIG. 5).

(Column AH)

=+AA5−T5−AI5 specifies which part of the portfolio's YTD return is due to "chance", after isolating excess return and market index from total return. This represents in fact the "stock picking" element, knowing that the evolution of the limited number of stocks held in portfolio will differ from the broadly gauged market index, such as S&P 500 average, NYSE or NASDAQ.

(Column AI)

=+(AF5/AF$7*3+AG5/AG$1*2)/(4)−1 specifies which part of the portfolio's YTD return is due to "index", calculating the evolution of the stock market. In the example, the index is weighted evenly between Dow and NASDAQ, two of the stocks held in portfolio being quoted on NYSE and two others on the NASDAQ.

(Column AJ)

=+T5 specifies which part of the portfolio's YTD return is due to the "method", in fact the excess return.

(Column AK)

=+AJ5+AI5+AH5 total YTD percentage return, summing up the influences of chance, index and method.

(Column AL)

=+AH5−AH6 calculates the return due to "chance" realized in one trading period (a day, a week).

(Column AM)

=+AI5−AI6 calculates the return due to "index" realized in one the trading period.

(Column AN)

=+AJ5−AJ6 calculates the return due to "method" realized in one trading period.

(Column AO)

=+AN5+AM5+AL5 calculates the total return realized in one trading period.

The next series of formulas specify the variance per stock and per day (or trading period), either the total variance (total gross return) or the method variance (gross excess return). See FIG. 6.

(Column AP up to AS)

=+(A5−A6)*L6 etc.

calculates the daily variance for each stock by multiplying the change in share price by the quantities of shares held on the previous day or period.

It is in fact the effect of the price movements of each stock individually, ignoring volume changes, which will end up in the total variance, as volume changes will balance out (apart from possible cash movements).

The YTD variance for each stock is on line 4

=+SOMME(AP5:AP$7) etc.

(Column AT)

=+SOMME(AP5:AS5)

adds up all individual stock variances for each day or period.

(Column AU)

=+SOMME(AT5:AT$7)

accumulates all periods to calculate YTD variance for the total portfolio.

(Column AV up to AY)

=+(A5−A6)*(L6−L$7) etc.

calculates the daily variance for each stock caused by the method, by multiplying the daily share price appreciation (or depreciation) by the additional (or less) number of shares held in the prior period.

The YTD variance for each stock is then calculated on line 4.

=+SOMME(AV5:AV$7) etc.

(Column AZ)

=+SOMME(AV5:AY5)

adds up all individual stock variances for each day or period.

(Column BA)

=+SOMME(AZ5:AZ$7)

accumulates all periods to calculate YTD method variance for the total portfolio.

Finally, the following cells calculate the transaction costs (FIG. 7):

(Columns BB up to BE)

=+ABS((L5−L6)*A5) etc.

calculates the daily transaction amounts for each stock, multiplying the difference in number of shares by the market price.

(Column BF)

=+SOMME(BB5:BE5)

sums up all proportional transaction costs of the day, then of all days, to calculate the eventual tax on stock market operations, as shown below (0.17% in this example).

=+SOMME(BF5:BF$7)*0.17% in cell BF8

(Column BG)

=+((BB5>0)*1+(BC5>0)*1+(BD5>0)*1+(BE5>0)*1)

counts the number of buy and sales transactions in order to calculate the total fee to be paid, as shown below ($29.95 per transaction in this example).

=+SOMME(BG5:BG$7)*29.95 In CELL BG8

(Cell BH8)

calculates total transaction costs by summing up all paid taxes and fees.

=(BF$8+BG$8)

(Cell BI8)

=BH$8/SOMME(BG5:BG$7)

calculates the average Cost per transaction.

Additionally, variances for the total portfolio and per individual stock can also be traced graphically, by applying the excel graphs to the different fields mentioned above.

A word on research. The disclosed program has been applied to test different scenarios and real situations. Historical research has been done for different portfolios with 4, 6, 8 and 12 different stocks, in different combinations and with different variables, over the last 20 years. The check is certainly not foolproof, but the outcomes seem to confirm the validity of the system, as they also unveil shortcomings, like in case of exceptional situations (wide spreads, inertia, long runs, fewer shares) that can disturb the regularity, increase risk with higher or lower returns than those demonstrated in the financial reasoning.

Testing also indicated that the best results were achieved with carefully selected stocks, as explained in the following paragraphs.

Initially selecting stocks is a crucial step, as it will not only determine the total return of the portfolio, but also the excess return that can be achieved with the disclosed method. An additional program has been developed for stock feeding, as explained in the next pages. Although the disclosed portfolio management method can be applied for any kind of portfolio with any kind of assets, the inventor has given preference to publicly traded stocks that fulfill the following conditions (qualitative and quantitative):

Qualitative:

Companies to last, having established businesses, products and markets, often market leaders in their major product lines.

Irreproachable management and corporate governance, sound accounting rules (respecting scrupulously and explaining clearly the application of US GAAP or IFRS standards), understandable structure and strategy.

Quantitative:

Value creators. Although it is impossible to calculate the intrinsic value of a share (there is always some combination of growth rate and growth period, which are impossible to predict), future free cash flow FFCF, and economic value added EVA, are used as the best indicators of the value of a stock.

Correctly priced (measured by price-to-earnings ratio P/E, or price-to-book ratio P/B, or price-to-earnings growth ratio PEG).

Depending on what guesses of rate and growth you made, you can convince yourself to pay any price. Again, the system prevents from doing so, obliging the investor to remain within a delimiting framework.

Low indebtedness (more long-lived safety).

Substantial market capitalization (to add to risk diversification and to assure timeliness trading; as an example, a selection of 8 a 12 stocks of the S&P 100 could do and, as a rule of thumb, minimum $2.5 billion).

Each of these conditions correspond with the investment philosophy that goes best with the system (good value, low risk, long term, don't overpay). The reasons for choosing these parameters and the way of combining them are explained in the following excel program (FIG. 8).

Each line relates to a company, while the columns contain the following data or formulas. Line 2 is reserved for a theoretical, ideal company. Values of line 2 can be adapted for specific conditions and to serve as a benchmark for the evaluation (P/E and D/E) of the real companies.

(Column A): company name (Column B)

=(100*(C3<−2)+10+10*(C3<(C$2+0.001))+10*(D3>(D$2−0.001))+10*(E3>(E$2−0.001)))*(1−1*C3/100)*(((D3−(2*D3))*(D3<0))/8)+(1+G3/100))*(1−0.6*(E3<−50)+E3*(E3>−50)/100)/100 calculates a bird's-eye-view indicator from zero to 10000, weighting a selection of the different parameters calculated hereafter. A low range (0, 1 or 2) means that the company fulfils all or almost all of the required conditions to be selected as a feasible buy (as opposed to a high or negative range).

Selection and weighting can also be adapted for situations, and can be combined as in the example:

EVA lower than −2%

P/E higher than 12, benchmark value of cell D2

D/E higher than 20, benchmark value of cell E2

(Column C)

=(+O3−M3+L3*0.65−(+W3*0.13+Y3*0.06*(Y3>0)))/(V3−(Y3)*(Y3<0))*100

Calculates the percentage economic value added (according a main metric branded as EVA™, by the US consulting firm of Stern Stewart). It calculates the value created, as the difference between net operating profit (corrected for interest) and the cost of capital. For our purpose, the application has been generalized, with equity cost set at 13% and debt cost after taxes at 6% (parameters to be adapted when circumstances change).

(Column D)

=R3/(O3/Q3)

Calculates P/E, price earnings ratio, dividing recent stock price by earnings per share.

(Column E)

=100*Y3/W3

Calculates D/E, debt to equity ratio, dividing net debt by equity.

(Column F)

=+R3*Q3/W3

Calculates price to book value, dividing total market value by stockholders' equity.

(Column G)

=(−100+(100*R3/(S3)))*(R3>0)+10000*(R3<0)

The premium paid today, as the percentage difference between recent price and the calculated value (Column S), (Column H up to N): input of financial data from the most recent (annualized) income statement, respectively: net sales; operating income; other income; interest income; interest expense; exceptional (incl. non-recurrent items, income from discontinued operations, effect of change in accounting and other extraordinary items), taxes.

(Column O)

=I3+K3−L3+M3−N3+J3 calculates net income.

(Column P): input of depreciation.

(Column Q): input of number of shares (diluted).

(Column R): Input of recent share price.

(Column S)

=0.75*(T3+2*U3)/(1+2*(U3>0))

weights the values calculated in column T and column U, by applying a ¾ security margin and by giving a higher weight to the more precise calculation imported in column T.

(Column T)

=(5*(O3−M3+L3*65%+P3−Z3)+((I3−N3)*((((O3−M3)/(V3−Y3*(Y3<0))))>0.085)*(1−(0.05/((O3−M3)/(V3−Y3*(Y3<0))))))/(0.1−0.05)+(((I3−N3)/0.1))*((((O3−M3)/(V3−Y3*(Y3<0)))<0.085)))/Q3

Calculates the value of the stock by weighting the different selection criteria.

(Column U)

Input of the value in terms of future free cash flow, as calculated by the valuation disk of McKinsey. If not available, this value is neutralized in the other formulas.

(Column V up to X): input of financial data from the most recent balance sheet, respectively: net assets, equity, provisions.

(Column Y)

=V3−W3−X3 calculates net debt, as the difference between net assets and equity+provisions.

(Column Z): Input of average capital expenditures for plant, property and equipment (for example, the average of the last 3 years).

(Column AA): input of dividends paid.

(Column AB up to AE): additional company information, respectively: listing, reporting year, dosing month, corporate governance indication.

(Column AF up to AJ): expresses the value of the company in its different components, compared to the share price:

(Column AF): stock-listing symbol.

(Column AG)

=+$W2/$Q2/$R2*100 compares equity per share and share price.

(Column AH)

=+$V2/$Q2/$R2*100 compares net assets per share and share price.

(Column AI)

=+$H2/$Q2/$R2*100 compares net sales per share and share price.

(Column AJ)

=+$I2/$Q2/$R2*100 compares operating result per share with share price.

(Column AK up to AP): expresses the following cash flow ratios:

(Column AK)

=(+O2+P2+L2*65%−Z2−M2)/$Q2/$R2*100 calculates the yearly future free cash flow and relates it to the share price.

(Column AL)

=+U2/R2*100 compares the future value with the actual share price.

(Column AM)

=+AL2/AK2 relates the future cash flow to the yearly cash flow.

(Column AN)

=100/AK2 as a P/E expression, relates price to yearly free cash flow.

(Column AO)

=+AK2/AH2 expresses yearly free cash flow as percentage of net assets (in fact the profitability of the assets used, in terms of free cash flow).

(Column AP)

=(AH2−AG2−($X2/$Q2/$R2*100))/AK2 compares financial debt with yearly free cash flow (in fact, the number of years required to reimburse creditors).

(Column AQ up to AW): follow up the evolution of the stock price, and determine when the stock becomes a buy opportunity:

(Column AQ): input of the share price at the beginning of the observation period.

(Column AR): retrieves the actual share price.

(Column AS): calculates the percentage price change since the beginning of the observation period.

(Column AT and AU): input of the two years highest and lowest prices.

(Column AS):

=+(AU3+AT3/2+S3)/3 calculates a strike price, taking the average between lowest price, half of the highest price and target price. It applies a pragmatic approach, trying to buy at the lowest or at target, and not paying more than 50% of the highest.

(Column AS):

=−(AV3−R3)/AV3 calculates the percentage over or under-evaluation of today's share price.

Let's now take the outcomes on line 3 for the company Johnson & Johnson (JNJ).

The result for JNJ can be summarized by looking mainly at columns B and AS: a very good rating of 1, as the result of high profitability, no debt and reasonable valuation; but the share price is rather expensive and 28% from strike price.

The results of company Centex (CTX) on line 4: very good rating of 0, with high profitability, low debt and good value; it was a buy before the share price doubled since the beginning of observation period.

With this additional program, the analysis of a 10-Q or 10-K report can be limited to about 15 minutes data input work and the selected companies can be followed up by checking the stock price from time to time. A reserve of stocks can be constituted and the market prices followed up, to prepare for future investing.

What is claimed is:

1. A method for improving the return of an investment portfolio including a plurality of shares for each of a plurality of different stocks, the method comprising:
providing a processor having spreadsheet functions, stored on a computer readable medium causing the computer to perform the steps of:
 a) forming pairs of said stocks, each pair including a first and a second stock, at least one of the stocks belonging to a plurality of pairs of stocks;
 b) for each of the pairs of stocks,
  i) determining an interrelated share price variation between the first and the second stock of said pair corresponding to the variation of the relative price difference between shares of the first and second stock of said pair;
  ii) comparing the interrelated share price variation with a predetermined price variation threshold and thereby triggering a signal to sell shares of one of the first and second stock and to buy shares of the other of the first and second stock; and,
  iii) when the interrelated share price variation exceeds the predetermined interrelated price variation threshold, tagging the pair and subsequently initializing the interrelated share price variation;
 c) after at least one pair of stocks have been tagged,
  i) selecting one sell candidate stock from the tagged pairs of stocks; and
  ii) selecting at least one buy candidate stock from the tagged pairs of stocks which includes a said sell candidate stock, wherein the price of a share of the sell candidate stock is rising compared to the price of a share of the buy candidate stock.

2. The method of claim 1 wherein said predetermined price variation threshold is a range of 5 to 30 percent.

3. The method of claim 1 wherein the step of forming pairs of said stocks comprises forming all possible pairs of said stocks.

4. The method of claim 1 wherein steps b) and c) are carried out periodically.

5. The method of claim 1 wherein the step of forming pairs of said stocks comprises forming all possible pairs of said stocks and wherein steps b) and c) are carried out periodically.

6. The method of claim 1 further comprising the step of determining a number of shares of the sell candidate stock to be sold as a proportion of the total number of shares of the sell candidate stock in the investment portfolio.

7. The method of claim 6 wherein the proportion of the total number of shares of the sell candidate stock in the investment portfolio is a range of 20 to 100 percent.

8. The method of claim 6 wherein the proportion of the total number of shares of the sell candidate stock in the investment portfolio is 50 percent.

9. The method of claim 6 wherein the proportion of the total number of shares of the sell candidate stock in the investment portfolio is determined as a function of the variation of the total number of shares of the sell candidate stock in the investment portfolio.

10. The method of claim 6 further comprising the step of determining a number of shares of the buy candidate stock to be bought as a function of the quantity and current market price of the shares of the sell candidate stock to be sold.

11. The method of claim 10 further comprising the steps of selling the quantity of shares of the sell candidate stock to be sold and buying the quantity of shares of the buy candidate stock to be bought.

12. The method of claim 6 further comprising the steps of:
comparing the quantity of shares of the sell candidate stock to be sold with a predetermined allowable minimum amount of shares per stock; and, adjusting the quantity of shares of the sell candidate stock to be sold so that the number of shares of the sell candidate stock to be sold remains within the predetermined allowable minimum amount of shares per stock.

13. The method of claim 6 further comprising the step of transmitting an order for selling the quantity of shares of the sell candidate stock to be sold.

14. The method of claim 1 further comprising the step of displaying an alert when an interrelated share price variation exceeds said predetermined price variation threshold.

15. The method of claim 14 wherein said alert comprises an indication to the corresponding first and second stock.

16. The method of claim 1 further comprising the step of on-line monitoring the current market share price of the stocks included in the pairs of stocks.

17. The method of claim 1 further comprising the steps of:
   determining suitability for at least one stock to be added to said investment portfolio as a function of associated company leadership, value creation, debt to equity or capitalization; and,
   selecting and adding the at least one stock to said investment portfolio as a function of the determined suitability.

18. The method of claim 1 further comprising the investment portfolio monitoring steps of:
   for each stock of the investment portfolio,
   monitoring the interrelated share price variation; and,
   monitoring the variation of the total amount of shares; and,
   monitoring the variation of the investment portfolio value.

19. The method of claim 18 further comprising the step of monitoring the share price variance of each stock of the investment portfolio.

20. A computer program stored on a computer readable storage medium for improving the return of an investment portfolio including a plurality of shares for each of a plurality of different stocks, the computer program comprising instructions executable by a computer for carrying out the steps of:
   a) forming pairs of said stocks, each pair including a first and a second stock, at least one of the stocks belonging to a plurality of pairs of stocks;
   b) for each of the pairs of stocks,
   i) determining an interrelated share price variation between the first and the second stock of said pair corresponding to the variation of the relative price difference between shares of the first and second stock of said pair;
   ii) comparing the interrelated share price variation with a predetermined interrelated price variation threshold and thereby triggering a signal to sell shares of one of the first and second stock and to buy shares of the other of the first and second stock; and,
   iii) when the interrelated share price variation exceeds the predetermined price variation threshold, tagging the pair and subsequently initializing the interrelated share price variation;
   c) after at least one pair of stocks have been tagged,
   i) selecting one sell candidate stock from the tagged pairs of stocks; and,
   ii) selecting at least one buy candidate stock from the tagged pairs of stocks which includes a said sell candidate stock, wherein the price of a share of the sell candidate stock is rising compared to the price of a share of the buy candidate stock.

21. The computer program of claim 20 wherein said predetermined price variation threshold is a range of 5 to 30 percent.

22. The computer program of claim 20 wherein instructions for carrying out the step of forming pairs of said stocks comprises instructions for carrying out the step of forming all possible pairs of said stocks.

23. The computer program of claim 20 further comprising instructions for carrying out the steps b) and c) periodically.

24. The computer program of claim 20 further comprising instructions for carrying out the step of determining a number of shares of the sell candidate stock to be sold as a proportion of the total number of shares of the sell candidate stock in the investment portfolio.

25. The computer program of claim 24 wherein the proportion of the total number of shares of the sell candidate stock in the investment portfolio is a range of 20 to 100 percent.

26. The computer program of claim 24 further comprising instructions for carrying out the step of determining a number of shares of the buy candidate stock to be bought as a function of the quantity and current market price of the shares of the sell candidate stock to be sold.

27. The computer program of claim 24 further comprising instructions for carrying out the steps of:
   comparing the quantity of shares of the sell candidate stock to be sold with a predetermined allowable minimum amount of shares per stock; and,
   adjusting the quantity of shares of the sell candidate stock to be sold so that the number of shares of the sell candidate stock to be sold remains within the predetermined allowable minimum amount of shares per stock.

28. The computer program of claim 24 further comprising instructions for carrying out the step of transmitting an order for selling the quantity of shares of the sell candidate stock to be sold.

29. The computer program of claim 20 further comprising instructions for carrying out the step of displaying an alert when an interrelated share price variation exceeds said predetermined price variation threshold.

30. The computer program of claim 20 further comprising instructions for carrying out the step of on-line monitoring the current market share price of the stocks included in the pairs of stocks.

31. The computer program of claim 20 further comprising instructions for carrying out the investment portfolio monitoring steps of:
   for each stock of the investment portfolio,
   monitoring the interrelated share price variation; and,
   monitoring the variation of the total amount of shares; and,
   monitoring the variation of the investment portfolio value.

* * * * *